United States Patent
Cromer et al.

(10) Patent No.: US 7,174,463 B2
(45) Date of Patent: Feb. 6, 2007

(54) METHOD AND SYSTEM FOR PREBOOT USER AUTHENTICATION

(75) Inventors: Daryl Carvis Cromer, Apex, NC (US); Joshua James Jankowsky, Raleigh, NC (US); Howard Jeffrey Locker, Cary, NC (US); Andy Lloyd Trotte, Raleigh, NC (US); James Peter Ward, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 857 days.

(21) Appl. No.: 09/971,553

(22) Filed: Oct. 4, 2001

(65) Prior Publication Data
US 2003/0070079 A1    Apr. 10, 2003

(51) Int. Cl.
*H04L 9/00*    (2006.01)
*H04K 1/00*    (2006.01)

(52) U.S. Cl. .................................. 713/186; 382/115
(58) Field of Classification Search ................ 713/186
See application file for complete search history.

(56) References Cited

U.S. PATENT DOCUMENTS

| | | | | |
|---|---|---|---|---|
| 4,951,249 A | * | 8/1990 | McClung et al. | 713/202 |
| 5,050,212 A | * | 9/1991 | Dyson | 713/187 |
| 5,444,850 A | * | 8/1995 | Chang | 713/155 |
| 5,448,045 A | | 9/1995 | Clark | |
| 5,454,000 A | * | 9/1995 | Dorfman | 714/54 |
| 5,572,590 A | * | 11/1996 | Chess | 726/22 |
| 5,680,547 A | * | 10/1997 | Chang | 713/1 |
| 5,867,802 A | * | 2/1999 | Borza | 340/5.53 |
| 5,933,498 A | | 8/1999 | Schneck et al. | |
| 5,949,882 A | * | 9/1999 | Angelo | 713/185 |
| 5,956,409 A | | 9/1999 | Chan et al. | |
| 6,035,398 A | | 3/2000 | Bjorn | |
| 6,122,738 A | * | 9/2000 | Millard | 713/187 |
| 6,167,517 A | | 12/2000 | Gilchrist et al. | |
| 6,185,316 B1 | | 2/2001 | Buffam | |
| 6,256,737 B1 | * | 7/2001 | Bianco et al. | 713/186 |
| 6,272,629 B1 | * | 8/2001 | Stewart | 713/2 |
| 6,463,537 B1 | * | 10/2002 | Tello | 713/182 |
| 6,539,101 B1 | * | 3/2003 | Black | 713/186 |

(Continued)

FOREIGN PATENT DOCUMENTS

WO    WO 9850875    11/1998

(Continued)

OTHER PUBLICATIONS

The EDP Auditor Journal, 1991 vol. II, Current Events—BioPassword by Phoenix Software: A Review by Alice M. Schumm.

(Continued)

*Primary Examiner*—Nasser Moazzami
*Assistant Examiner*—David Garcia Cervetti
(74) *Attorney, Agent, or Firm*—Sawyer Law Group LLP

(57) ABSTRACT

A method for authentication in a computer system includes registering a biometric template in the computer system, thereafter, verifying the authenticity of the registered biometric template and then comparing the biometric template with a biometric image of a user if the biometric template is authentic. If the user's biometric image matches the biometric template, the computer system will continue to boot.

41 Claims, 5 Drawing Sheets

U.S. PATENT DOCUMENTS

| | | | |
|---|---|---|---|
| 6,560,706 B1 * | 5/2003 | Carbajal et al. | 713/155 |
| 6,633,981 B1 * | 10/2003 | Davis | 713/189 |
| 2002/0087877 A1 * | 7/2002 | Grawrock | 713/200 |
| 2002/0174353 A1 * | 11/2002 | Lee | 713/193 |
| 2003/0061497 A1 * | 3/2003 | Zimmer | 713/189 |

FOREIGN PATENT DOCUMENTS

WO    WO 9965175    12/1999

OTHER PUBLICATIONS

IBM Technical Disclosure Bulletin, vol. 41 No. 01 Jan. 1998, Biometric Access Control in a Personal Computer System.

* cited by examiner

METHOD AND SYSTEM FOR PREBOOT USER AUTHENTICATION

FIELD OF THE INVENTION

The present invention relates generally to the field of computer security and particularly to a method and system for preboot system authentication of a user.

BACKGROUND OF THE INVENTION

With the advent of personal computer system use in every day personal and business affairs, the issue of computer security has become critical. To protect the information contained in the personal computer system, which in many cases may be highly sensitive and confidential, measures must be taken to ensure that a user attempting to use the computer system is an authorized user. These protective measures should be taken before the operating system ("OS") boots because once the OS boots, files can be deleted, copied, or modified to help a rogue user gain access to the computer system.

Preboot security systems prevent the computer system from booting if a security breach is detected. So for instance, a user attempting to use the computer system may be required to enter a password before the computer system will boot. While this method is simple, it has its drawbacks. First, a rogue user can steal a password from an authorized user and enter the password to gain access. Second, an authorized user could forget the password and therefore be locked out of the computer system.

Currently, biometric data, such as a finger print, is being used to identify authorized users in a variety of applications. Using biometric data as a security check is advantageous because such data is unique to each individual and presumably no other person could replicate or steal such data. Moreover, biometric data is characteristic of the individual. The individual need not remember this data because it is an inherent part of his or her being.

Applications utilizing biometric authentication generally include some device or sensor that receives the biometric information. Thus, a sensor can be used to capture data corresponding to a thumbprint or fingerprint. This data is then transmitted to an application that creates a template that can be stored and used later when some type of authentication is required. In such a situation, a current biometric image is captured from the sensor and compared to the biometric template stored previously. If the image and template match, then the action requested will be granted. Otherwise, the request will be denied.

Biometric authentication at the computer system preboot stage is very desirable. Nevertheless, implementing such a security system is difficult. The OS preboot is typically controlled by the Basic Input and Output System ("BIOS"). The available memory and executable code in BIOS is very limited, and BIOS would not be able to accommodate the memory and code required to implement a biometric authentication system.

Accordingly, what is needed is a system and method for preboot OS authentication of a user using biometric information. The system and method should ensure that the biometric information stored is valid and that such information can be used by BIOS. The present invention addresses such needs.

SUMMARY OF THE INVENTION

The present invention provides a method and system for authenticating a user of a computer system using biometric information. The method and system of the present invention includes registering a biometric template in the computer system, thereafter, verifying the authenticity of the registered biometric template and then comparing the biometric template with a biometric image the user if the biometric template is authentic. If the user's biometric image matches the biometric template, the computer system will continue to boot.

The present invention offers multiple layers of security in that it verifies the authenticity of the biometric template before the template is used to authenticate the identity of the user attempting to log on to the computer system. In this manner, the computer system is protected from intruders. Moreover, because registration of the template is performed by an application program outside of BIOS, the limited resources available in BIOS are not depleted.

DETAILED DESCRIPTION

The present invention provides a method and system for authenticating a user of a computer using biometric information. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a preferred embodiment of the present invention, a sensor for obtaining the biometric information is coupled to the computer system, which includes a processor. The processor runs an application which allows a system administrator to register the biometric information of an authorized user into the computer system. The registered biometric information is then stored in memory, preferably, nonvolatile memory. Thereafter, when a user tries to log on to the computer system, the user will be prompted to submit his or her biometric information, e.g., fingerprint, via the sensor prior to a system boot. The BIOS will retrieve the stored biometric template, verify its authenticity, and compare it to the submitted biometric information. If the biometric template is authentic and the submitted biometric information matches the biometric template, the system will boot. Otherwise, the system will not boot and the administrator will be notified.

Figure 1:
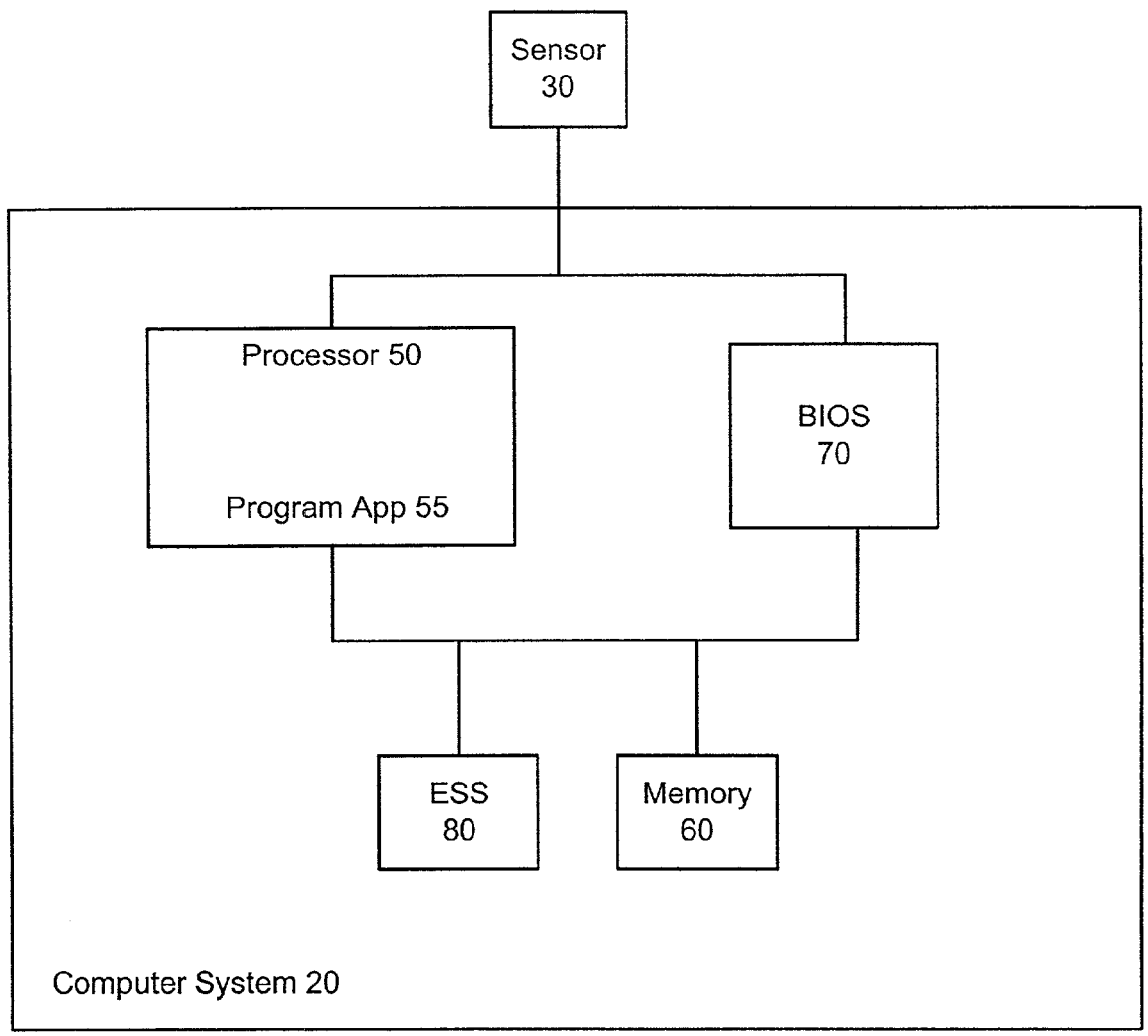
FIG. 1 is a block diagram illustrating a preferred embodiment of a system in accordance with the present invention.

FIG. 1 is a system that can be utilized in accordance with the preferred embodiment of the present invention. The system 10 includes a computer system 20 coupled to a biometric sensor 30. The sensor 30 can either be a stand-alone device, which can be coupled to the computer system 20 via a Universal Serial Bus ("USB") port, for example, or the sensor 30 can be an integral part of the computer system 20. The computer system 20 includes a processor 50 coupled to the sensor 30 for receiving biometric information. The processor 50 runs a program application 55 that registers an authorized user's biometric information.

As is shown, the computer system 20 includes a BIOS 70 and nonvolatile memory 60 accessible by the BIOS 70. The computer system 20 also includes an embedded security system 80, which is coupled to both the processor 50 and the BIOS 70.

Figure 2:
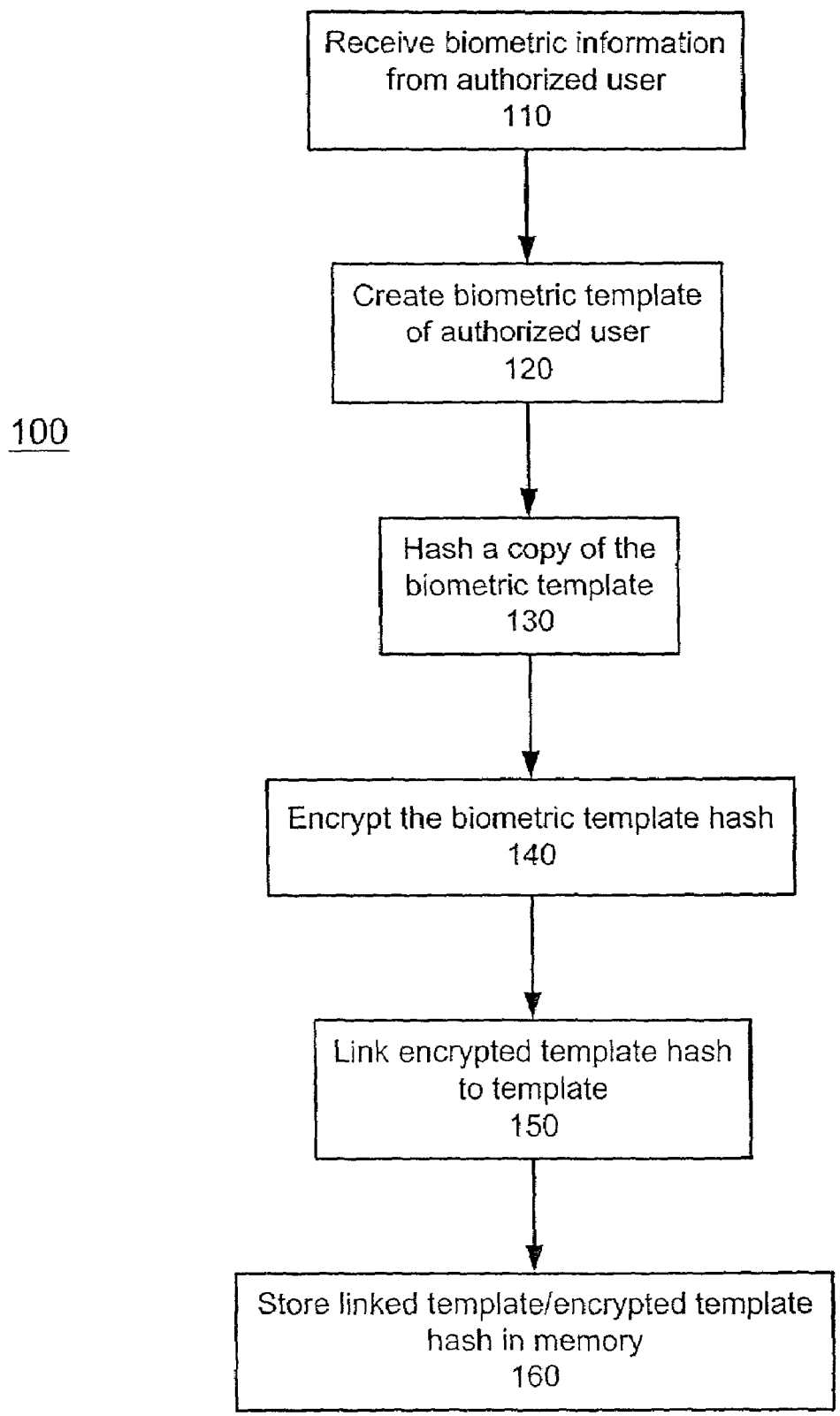
FIG. 2 is a flowchart illustrating the template registration process in accordance with the present invention.
Figure 2A:
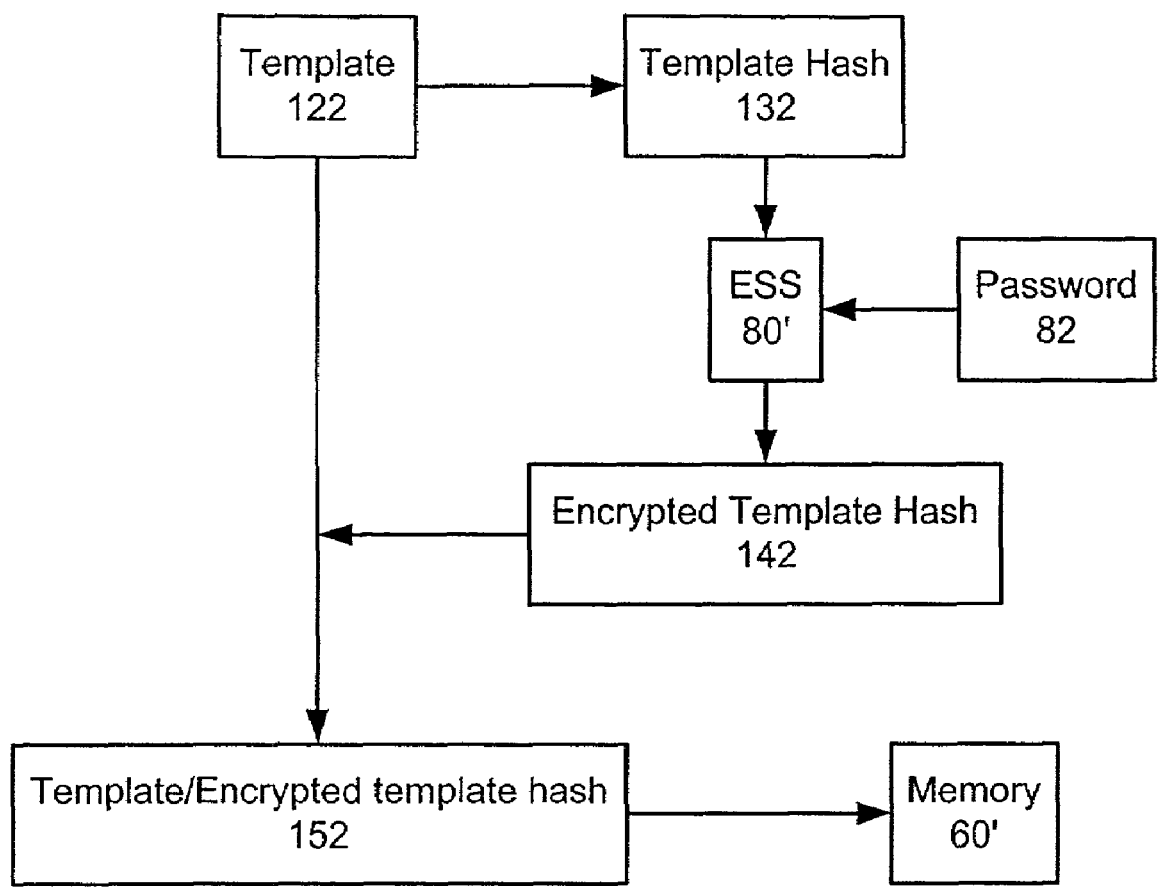
FIG. 2A is a block diagram depicting the process in FIG. 2.

To understand the preferred embodiment of the present invention, please refer first to FIGS. 2 and 2A. FIG. 2 is a flowchart illustrating a process for registering the biometric information of an authorized user in accordance with one preferred embodiment of the present invention. FIG. 2A is a block diagram illustrating the same process. The registering process 100 begins at step 110 by receiving biometric information from an authorized user via the sensor 30. The sensor 30 then renders the biometric information and creates a biometric template 122 (FIG. 2A) for the authorized user via step 120. The biometric template 122 is a mathematical representation of the biometric information, e.g., fingerprint, collected by the sensor 30. The biometric template 122 is then passed to the application program 55 running on the processor 50.

Next, in step 130, the application 55 hashes a copy of the biometric template to form a biometric template hash 132. By hashing the biometric template 122, i.e., applying a hash algorithm to the template, slight changes between the template 122 and another hashed template (not shown) can be easily detected, as is well known to those skilled in the art. The biometric template hash 132 is then encrypted in step 140 by the embedded security system 80'.

The embedded security system ("ESS") 80' is preferably a computer chip that performs a digital signature on the biometric template hash 132. In order to access the functionality of the ESS 80', the user or administrator could be required to enter a valid password 82, which would be verified by the ESS 80'. Once the template hash 132 is encrypted, i.e. digitally signed, it is passed back to the application 55, which then links the encrypted template hash 142 to the biometric template 122, via step 150. The linked template and encrypted template hash pair 152 is then stored in memory 60' in step 160. In the preferred embodiment of the present invention, the linked template/template hash 152 is written to a designated area in CMOS 60', so that it can later be accessed by the BIOS 70.

After registering the authorized user's biometric template 122, the linked template/template hash 152 is now available for user authentication during the next system boot. Because the application program 55 performs the registration process outside of BIOS 70, it is more efficient and user friendly.

Figure 3:
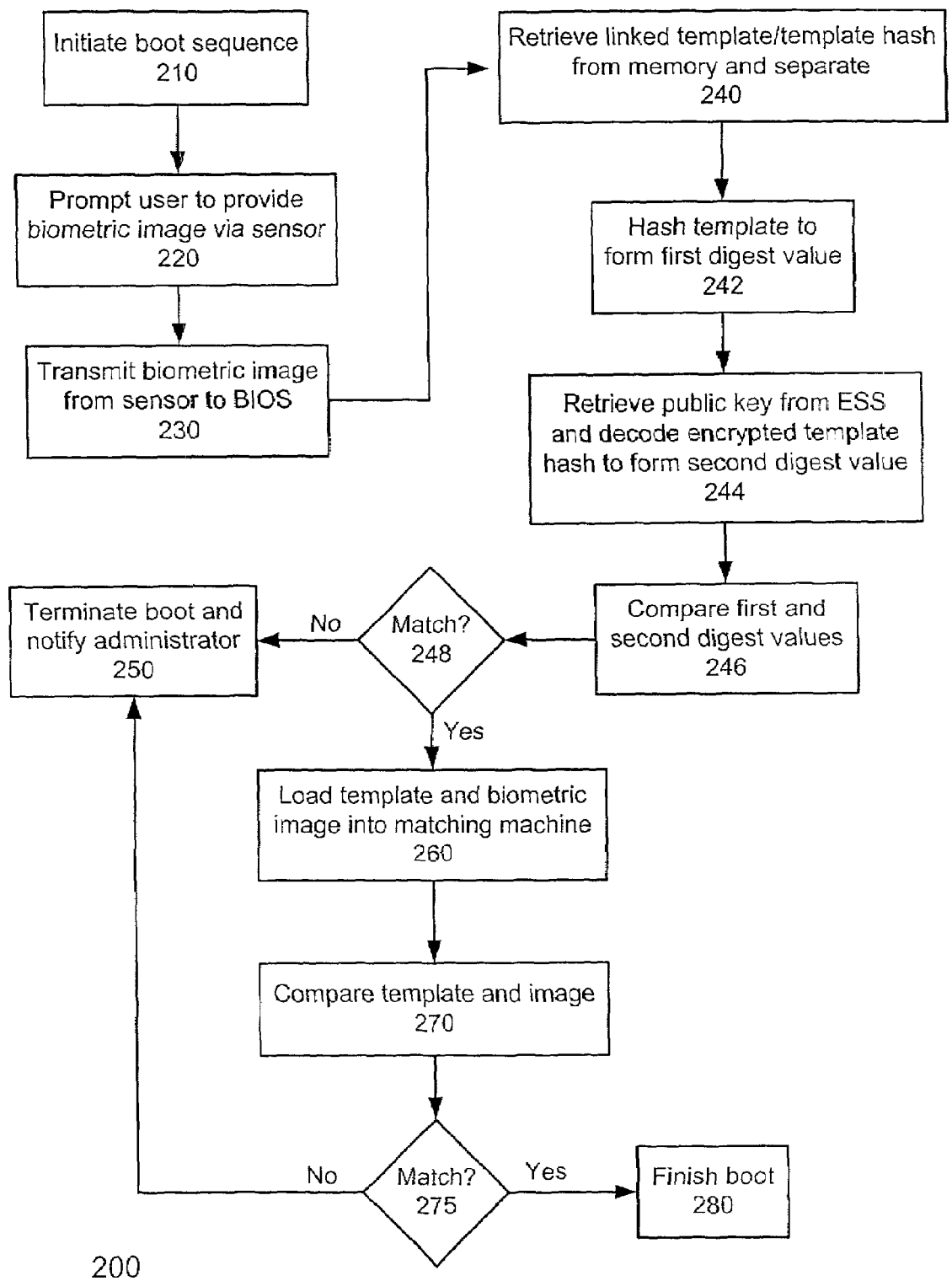
FIG. 3 is a flowchart illustrating the preboot authentication process in accordance with the present invention.
Figure 3A:
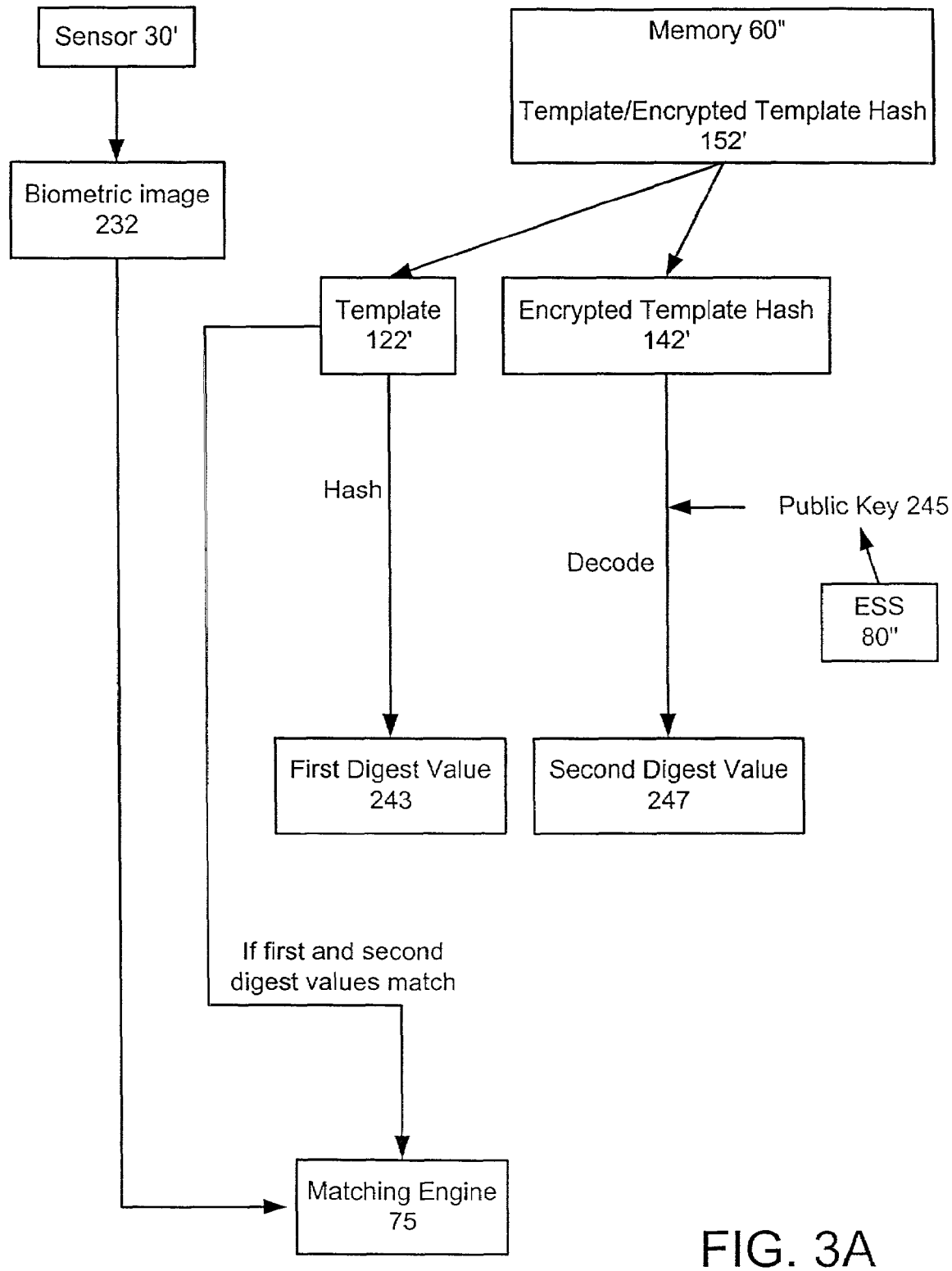
FIG. 3A is a block diagram depicting the process in FIG. 3.

FIG. 3, also a flowchart, illustrates the process for preboot system authentication in accordance with the preferred embodiment of the present invention. FIG. 3A is an associated block diagram illustrating the same. The process 200, begins when the BIOS 70 initiates a booting sequence in step 210. The BIOS 70 then prompts the user in step 220 to provide his or her biometric information, e.g., fingerprint, via the sensor 30' (FIG. 3A). In step 230, a biometric image 232 is transmitted from the sensor 30' to BIOS 70.

Next, BIOS verifies that the biometric template stored in memory is authentic, i.e., the biometric template is the one certified by the administrator. First, in step 240, BIOS retrieves the linked template/encrypted template hash 152' from memory 60" and separates the pair into the template 122' and the encrypted template hash 142.' In step 242, a hash of the template 122' is calculated to form a first digest value 243. Next, in step 244, BIOS retrieves a public key 245 for the administrator from the ESS 80" and uses it to decode the encrypted template hash 142.' The result is a second digest value 247 representing the decoded template hash 142'. Finally, the first digest value 243 is compared to the second digest value 247 in step 246, and in step 248, it is determined whether the digest values 243, 247 match. If the digest values 243, 247 do not match, the boot sequence is terminated and the administrator notified via step 250. If the digest values 243, 247 match, BIOS 70 has verified that the template 122' has not been altered since the administrator registered the template 122,' and that the template 122' can now be used to verify the identity of the user attempting to log onto the computer system.

Thus, once the template 122' is authenticated, it is loaded into a matching engine 75 in BIOS 70, via step 260, along with the biometric image 232 provided by the user. There, the template 122' and biometric image 232 are compared in step 270. One should note that an exact match between the template 122' and biometric image 232 is not necessarily required because a user would not be expected to provide his or her biometric information in the exact same manner or location each and every time. For instance, the user providing a finger print (biometric information) might place his or her finger in a slightly different location on the sensor 30' each time he or she is prompted to provide biometric information. Thus, in one embodiment of the present invention, a matching algorithm is used in the matching engine 75 to compare "points" from the biometric image 232 and the template 122'. Other methods and algorithms to compare the image 232 and the template 122' would be readily apparent to those skilled in the art, and such methods would fall within the scope and spirit of the present invention.

In step 275, it is determined whether the biometric image 232 matches the template 122.' If a match is determined, the user is the authorized user certified by the administrator, and BIOS 70 will continue to execute the boot sequence in step 280. If a match is not determined, the user is not authorized to operate the computer system and the boot sequence will terminate and the administrator notified, via step 250.

The preferred embodiment of the present invention, therefore, provides a system and method for performing user authentication during the initial boot sequence using biometric information. Through aspects of the present invention, an unauthorized user would be prevented from tampering with the stored template, i.e., replacing the registered template with an unauthorized template, because of the additional encryption steps provided by the ESS during the registration phase. Thus, the present invention offers multiple layers of security in that it verifies the authenticity of the stored template before the template is used to authenticate the identity of the user attempting to log onto the computer system. In this manner, the computer system is protected from intruders. Moreover, because registration of the template is performed by an application program outside of BIOS, the limited resources available in BIOS are not depleted.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for authenticating a user of a computer system, the method comprising the steps of:
   (a) registering a biometric template for the user in the computer system;
   (b) verifying the authenticity of the biometric template each time the user attempts to log on to the computer system; and
   (c) comparing the biometric template with a biometric image of the user if the biometric template is authentic.

2. The method of claim 1, wherein the registering step (a) further includes the steps of:
   (a1) prompting an authorized user to enter biometric information via a sensor coupled to the computer system;
   (a2) creating the biometric template from the biometric information;
   (a3) calculating a biometric template hash of the biometric template by hashing a copy of the biometric template; and
   (a4) encrypting the biometric template hash.

3. The method of claim 2, wherein the registering step (a) further includes the steps of
   (a5) linking the biometric template to the encrypted biometric template hash; and
   (a6) storing the linked biometric template and encrypted biometric template hash in a memory in the computer system.

4. The method of claim 2, wherein the step of calculating the biometric template hash (a3) further includes the step of:
   (a3i) applying a hash algorithm to the biometric template to hash the biometric template.

5. The method of claim 4, wherein the step of encrypting (a4) further includes the steps of:
   (a4i) performing a digital signature on the biometric template hash.

6. The method of claim 3, wherein the step of storing (a6) further includes the step of
   (a6i) providing a nonvolatile memory for storing the linked biometric template and encrypted biometric template hash.

7. The method of claim 3, wherein the step of comparing the user's biometric image (c) further includes the steps of:
   (c1) initiating a preboot sequence in a BIOS;
   (c2) prompting the user to enter his or her biometric information through the sensor; and
   (c3) sending the biometric image from the sensor to the BIOS.

8. The method of claim 7, wherein the verifying step (b) further includes the steps of:
   (b1) retrieving from memory the linked biometric template and encrypted biometric template hash;
   (b2) hashing the linked biometric template to form a first digest value;
   (b3) decoding the encrypted biometric template hash to form a second digest value; and
   (b4) comparing the first digest value to the second digest value.

9. The method of claim 8 further including the step of:
   (d) terminating the preboot sequence if the first digest value and the second digest value do not match.

10. The method of claim 9, wherein the comparing step (c) further includes the steps of:
    (c4) loading the biometric template into a matching engine in the BIOS;
    (e5) loading the user's biometric image into the matching engine; and
    (c6) applying a matching algorithm to compare points in the user's biometric image to points in the biometric template.

11. The method of claim 10 further including the step of:
    (e) booting the computer system if the user's biometric image matches the biometric template.

12. The method of claim 11 further including the step of:
    (f) terminating the preboot sequence if the user's biometric image fails to match the biometric template.

13. A computer readable medium containing programming instructions for authenticating a user of a computer system, the programming instructions for:
    (a) registering a biometric template for the user in the computer system;
    (b) verifying the authenticity of the biometric template each time the user attempts to log on to the computer system; and
    (c) comparing the biometric template with a biometric image of the user if the biometric template is authentic.

14. The computer readable medium of claim 13, wherein the registering instruction (a) includes:
    (a1) prompting an authorized user to enter biometric information via a sensor coupled to the computer system;
    (a2) creating the biometric template from the biometric information;
    (a3) calculating a biometric template hash of the biometric template by hashing a copy of the biometric template; and
    (a4) encrypting the biometric template hash.

15. The computer readable medium of claim 14, wherein the registering instruction (a) further includes instructions for:
    (a5) linking the biometric template to the encrypted biometric template hash; and
    (a6) storing the linked biometric template and encrypted biometric template hash in a memory in the computer system.

16. The computer readable medium of claim 14, wherein the instruction for calculating the biometric template hash (a3) further includes instructions for: (a3i) applying a hash algorithm to the biometric template to hash the biometric template.

17. The computer readable medium of claim 16, wherein the instruction for encrypting (a4) further includes the instructions for: (a4i) performing a digital signature on the biometric template hash.

18. The computer readable medium of claim 15, wherein the instruction for storing (a6) further includes the instruction for: (a6i) providing a nonvolatile memory for storing the linked biometric template and encrypted biometric template hash.

19. The computer readable medium of claim 15, wherein the instruction for comparing the user's biometric image (c) further includes the instructions for:
    (c1) initiating a preboot sequence in a BIOS;
    (c2) prompting the user to enter his or her biometric information through the sensor; and
    (c3) sending the biometric image from the sensor to the BIOS.

20. The computer readable medium of claim 19, wherein the verifying instruction (b) further includes the instructions for:
  (b1) retrieving from memory the linked biometric template and encrypted biometric template hash;
  (b2) hashing the linked biometric template to form a first digest value;
  (b3) decoding the encrypted biometric template hash to form a second digest value; and
  (b4) comparing the first digest value to the second digest value.

21. The computer readable medium of claim 20 further including the instruction for:
  (d) terminating the preboot sequence if the first digest value and the second digest value do not match.

22. The computer readable medium of claim 21, wherein the comparing instruction (c) further includes the instructions for:
  (c4) loading the biometric template into a matching engine in the BIOS;
  (c5) loading the user's biometric image into the matching engine; and
  (c6) applying a matching algorithm to compare points in the user's biometric image to points in the biometric template.

23. The computer readable medium of claim 22 further including the instruction for:
  (e) booting the computer system if the user's biometric image matches the biometric template.

24. The computer readable medium of claim 23 further including the instruction for:
  (f) terminating the preboot sequence if the user's biometric image fails to match the biometric template.

25. A system for authenticating a user of a computer system comprising:
  a processor running an application program for registering a biometric template for the user;
  means for verifying authenticity of the biometric template each time the user attempts to log on to the computer system;
  a sensor coupled to the processor for allowing the user to enter his or her biometric image into the computer system; and
  means for comparing the biometric template with the biometric image of the user if the biometric template is authentic.

26. The system of claim 25, wherein the application program hashes a copy of the biometric template to form a biometric template hash.

27. The system of claim 26 further including an embedded security system for encrypting the biometric template hash by performing a digital signature on the biometric template hash.

28. The system of claim 27, wherein the application program links the biometric template to the encrypted biometric template hash, and writes the linked biometric template and encrypted biometric template hash to a memory in the computer system.

29. The system of claim 28, wherein the memory is non-volatile memory accessible by a BIOS.

30. The system of claim 29, wherein the means for verifying is in the BIOS.

31. The system of claim 30, wherein the BIOS retrieves the linked biometric template and encrypted biometric template hash, hashes the linked biometric template to form a first digest value, decodes the encrypted biometric template hash to form a second digest value, and compares the first digest value to the second digest value.

32. The system of claim 31, wherein the means for comparing is a matching engine in the BIOS, wherein the biometric image of the user and the authenticated biometric template is loaded into the matching machine.

33. The system of claim 31 further including means for terminating a preboot sequence if the first digest value and second digest value do not match.

34. The system of claim 33 further including means for terminating the preboot sequence if the user's biometric image fails to match the biometric template.

35. A method for registering a biometric template in a computer system, the method comprising the steps of:
  (a) prompting a user to provide biometric information to a computer system via a sensor coupled to the computer system;
  (b) creating a biometric template from the biometric information;
  (c) calculating a biometric template hash from the biometric template by hashing a copy of the biometric template; and
  (d) encrypting the biometric template hash.

36. The method of claim 35, wherein the step of encrypting (d) further includes the steps of:
  (d1) performing a digital signature on the biometric template hash.

37. The method of claim 35 further including the steps of:
  (e) linking the biometric template to the encrypted biometric template hash; and
  (f) storing the linked biometric template and encrypted biometric template hash in a memory in the computer system.

38. The method of claim 37, wherein the step of storing (f) further includes the step of:
  (f1) providing a nonvolatile memory for storing the linked biometric template and encrypted biometric template hash.

39. A computer readable medium containing programming instructions for registering a biometric template in a computer system, including the instructions for:
  (a) prompting a user to provide biometric information to a computer system via a sensor coupled to the computer system;
  (b) creating a biometric template from the biometric information;
  (c) calculating a biometric template hash from the biometric template by hashing a copy of the biometric template; and
  (d) encrypting the biometric template hash.

40. The computer readable medium of claim 39, wherein the instruction for encrypting (d) further includes the instructions for:
  (d1) performing a digital signature on the biometric template hash.

41. The computer readable medium of claim 39 further including instructions for:
  (e) linking the biometric template to the encrypted biometric template hash; and
  (f) storing the linked biometric template and encrypted biometric template hash in a nonvolatile memory in the computer system.

* * * * *